(12) United States Patent
Cheng (10) Patent No.: US 11,679,973 B1
(45) Date of Patent: Jun. 20, 2023

(54) SYSTEM FOR ADVANCE NOTIFICATION OF REPLACING WATER BOTTLE BASED ON HISTORICAL CONSUMPTION DATA AND A WATER DISPENSER THEREOF

(71) Applicant: Kuang-F Cheng, Taipei (TW)

(72) Inventor: Kuang-F Cheng, Taipei (TW)

( * ) Notice: Subject to any disclaimer, the term of this patent is extended or adjusted under 35 U.S.C. 154(b) by 0 days.

(21) Appl. No.: 17/835,510

(22) Filed: Jun. 8, 2022

(51) Int. Cl.
*B67D 3/00* (2006.01)
*G01F 23/20* (2006.01)

(52) U.S. Cl.
CPC ......... *B67D 3/0093* (2013.01); *B67D 3/0029* (2013.01); *B67D 3/0061* (2013.01); *B67D 3/0077* (2013.01); *G01F 23/205* (2013.01)

(58) Field of Classification Search
CPC .. B67D 3/0093; B67D 3/0029; B67D 3/0061; B67D 3/0077; G01F 23/205
See application file for complete search history.

(56) References Cited

U.S. PATENT DOCUMENTS

| | | | |
|---|---|---|---|
| 9,227,828 B2 | 1/2016 | Groesbeck | |
| 9,738,506 B2 | 8/2017 | Groesbeck | |
| 9,790,079 B2* | 10/2017 | Groesbeck | B67D 3/0009 |
| 2019/0345019 A1* | 11/2019 | Cheng | B67D 3/0032 |
| 2022/0306446 A1* | 9/2022 | Affan | B67D 3/0093 |

* cited by examiner

*Primary Examiner* — Frederick C Nicolas
(74) *Attorney, Agent, or Firm* — Muncy, Geissler, Olds & Lowe, P.C.

(57) ABSTRACT

A system for advance notification of replacing or ordering a water bottle based on historical consumption data, and a water dispenser. The system includes a server, a water dispenser, a weight sensor, and a user device. The weight sensor measures weights of a replaceable water bottle on the water dispenser at different times and transmits the weights back to the server, so as to make multiple determinations with respect to the weights and accordingly obtain the consumption of the replaceable water bottle over time, thereby reminding a user to replace the replaceable water bottle and to make a new order.

12 Claims, 12 Drawing Sheets

SYSTEM FOR ADVANCE NOTIFICATION OF REPLACING WATER BOTTLE BASED ON HISTORICAL CONSUMPTION DATA AND A WATER DISPENSER THEREOF

FIELD OF THE INVENTION

The present invention relates to a water dispenser and a system thereof, particularly to a system for advance notification of replacing or ordering a water bottle based on historical consumption data and a water dispenser.

BACKGROUND OF THE INVENTION

For drinking water in a common household, besides using tap water taken from a tap water pipeline and boiled to obtain drinkable water, a water bottle can be sent to a user by delivery, such as to a residence or office, that is, a packaged replaceable water bottle is directly delivered to the user by a water bottle supplier and mounted on a water dispenser. After water in the water bottle is used up, the user sends a notification to the water bottle supplier so that the water bottle supplier delivers a new replaceable water bottle to the user for supplementation.

Related techniques for a water dispenser provided with a water bottle can be seen, for example, in U.S. Pat. Nos. 9,227,828, 9,790,079, 9,738,506, and the like. In the prior art, if a user orders five water bottles at one time, the user needs to determine by themselves whether water in a single water bottle is about to be or is already used up, so as to replace the water bottle.

SUMMARY OF THE INVENTION

At least one example of this disclosure includes a system for advance notification of replacing water bottle based on historical consumption data. The system comprises one or more hardware processors configured by machine-readable instructions to: receive a plurality of measured weights of a water bottle over a time period, which is measured and mounted on the water dispenser; and determine whether the measured weights of the water bottle before and at a reference time satisfy the following relationships:

$$(W_t - W_{t-1}) > C1; \text{ and} \quad\quad\quad A.$$

$$|W_t - W_0| < C2; \quad\quad\quad B.$$

wherein $W_t$ denotes the measured weight of the water bottle at the reference time t, $W_{t-1}$ denotes the measured weight of the water bottle at an earlier time t−1 earlier in time than the reference time t, $W_0$ denotes a predetermined initial weight of the water bottle, C1 denotes a first predetermined value and C2 denotes a second predetermined value.

If a relationship A and a relationship B are satisfied, the water bottle at the reference time is regarded as a new water bottle; and if the relationship A and the relationship B are not satisfied, then the measured weight of the reference time with a threshold value are compared.

If the measured weight of the reference time is below the threshold value, it is determined whether the measured weight at the reference time is valid when the measured weights of the water bottle before, after and at the reference time satisfy the following relationships:

$$(W_{t-1} - W_t) < C3; \text{ and} \quad\quad\quad C.$$

$$(W_{t+1} - W_t) < C4; \quad\quad\quad D.$$

wherein $W_{t+1}$ denotes the measured weight of the water bottle at a later time t+1 later in time than the reference time t, C3 denotes a third predetermined value, and C4 denotes a fourth predetermined value.

When the measured weight at the reference time is valid, a notification is sent out to a customer of the water dispenser.

DETAILED DESCRIPTION OF THE PREFERRED EMBODIMENTS

The terminology used herein in the description of the various embodiments is for the purpose of describing particular examples only and is not intended to be limiting. As used herein, the singular forms "a," "an," and "the" include the plural forms as well, unless the context clearly indicates otherwise, or intentionally defines the number of elements.

The present invention discloses a system for advance notification of replacing or ordering a water bottle based on historical consumption data. A method for the system is implemented in a computer system having one or more hardware processors configured by machine-readable instructions. The system and method described in the following embodiments enable a water bottle supplier to acquire the water quantity of a replaceable water bottle currently used by a user, and to determine, by sensing the water quantity in real-time, whether the water bottle needs to be replaced or a new replaceable water bottle needs to be ordered, so as to send a reminder to the user. In the following description of the embodiments, the term "replaceable water bottle" is as same as "water bottle", unless otherwise specifically indicated, or it is principally apparent that it is not.

Figure 1:
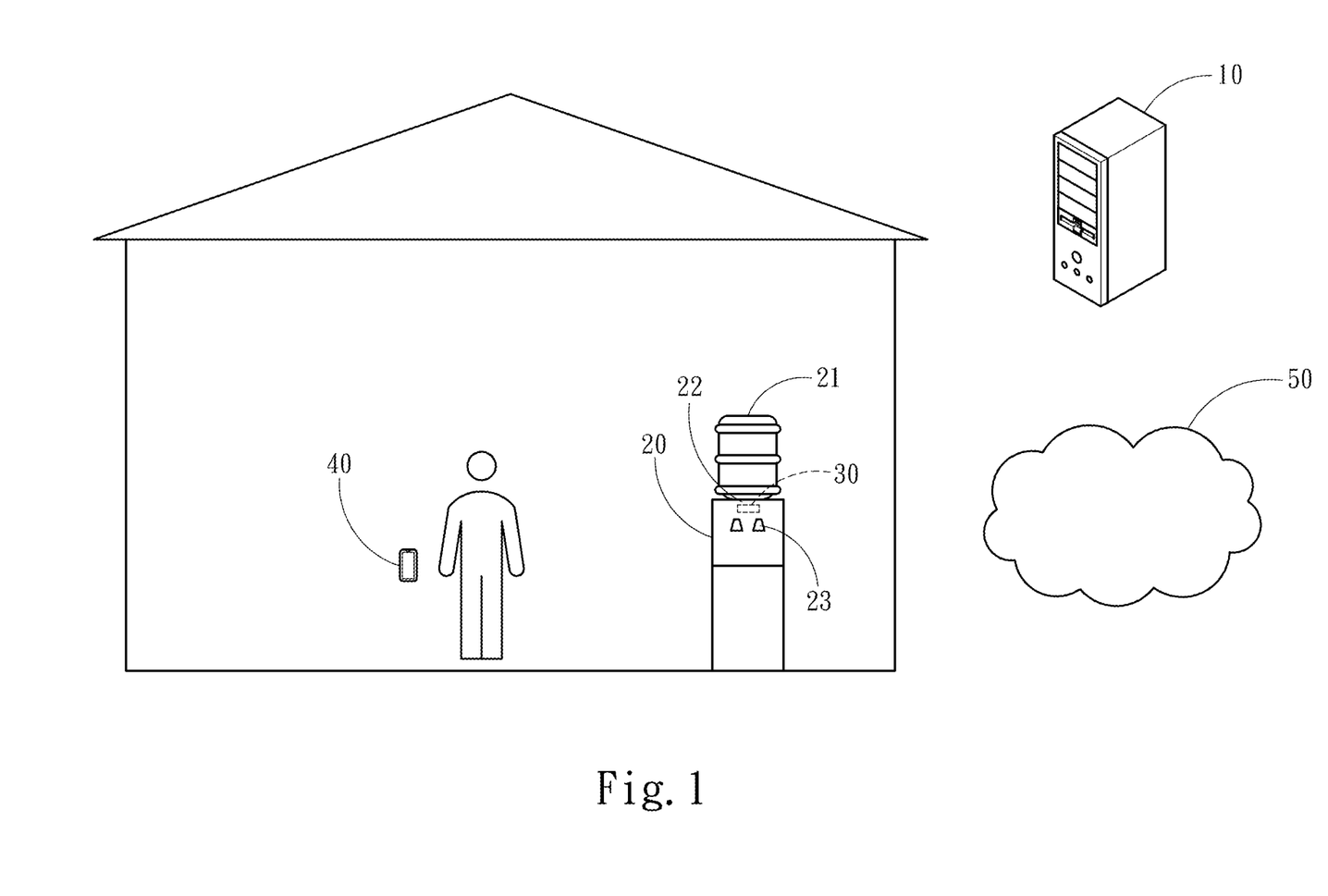
FIG. 1 shows a contextual diagram according to an embodiment of the present invention.

FIG. 1 shows a contextual diagram according to an embodiment of the present invention. In FIG. 1, the system includes a server 10, a water dispenser 20, a weight sensor 30, and a user device 40.

Figure 2:
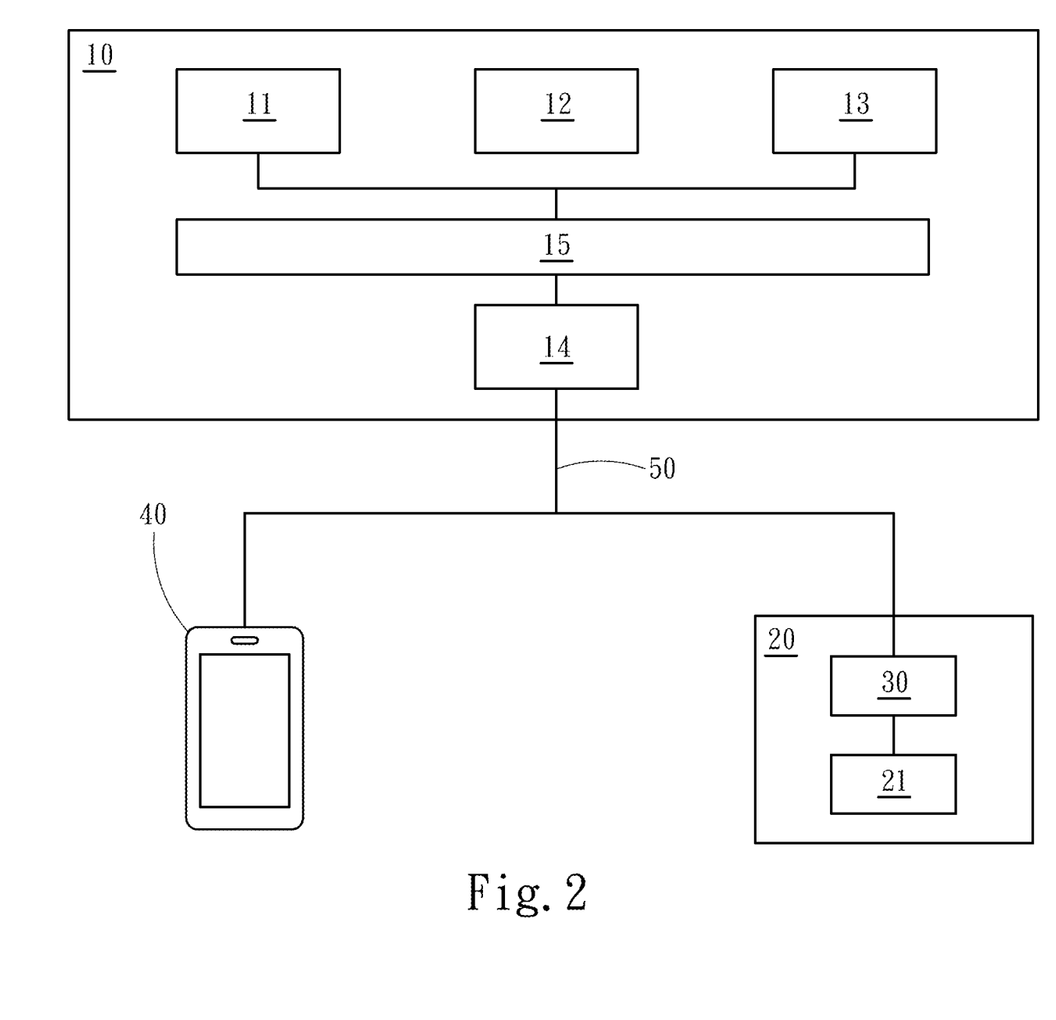
FIG. 2 shows a block diagram according to an embodiment of the present invention.

FIG. 2 shows a block diagram according to an embodiment of the present invention. The server 10 may include a processor 11, a storage 12, a memory 13, a communication interface 14, an I/O sub-system 15 and/or other components.

The storage 12 may include a non-transitory storage medium that stores information electronically.

In some embodiments, the processor 11 may be configured in a server to provide an information processing capability. The processor 11 may include a digital processor, an analog processor, a digital circuit capable of processing information, an analog circuit capable of processing information, and/or one or more other mechanisms used to process information electronically. Although the processor 11 is presented as a single block, the configuration is only intended to be illustrative. In some embodiments, the processor 11 may include a plurality of processing units. The plurality of processing units may be physically located in one device, or the processor 11 may represent processing functions of a plurality of cooperating devices. On the other hand, the processor 11 may execute related functions via software, hardware, firmware or a combination thereof.

An electronic storage medium of the storage 12 may include a storage device provided integrally with the server 10 (i.e. substantially unremovable), and/or a removable storage device movably connected to the server 10 via, for example, a port (such as a USB port) or a disk drive. The storage 12 may include one or more of the following: an optically readable storage medium (such as an optical disk), a magnetically readable storage medium (such as a magnetic tape, a magnetic hard disk, a floppy disk drive and the like), a charge-based storage medium (such as an EEPROM, a RAM and the like), a solid-state storage medium (such as a flash memory driver), and/or other electronic readable storage media. The storage 12 may further include one or more virtual storage sources (such as a cloud storage device, a virtual private network and/or other virtual storage resources).

In some embodiments, the user device 40 may be implemented by using any proper combination of hardware and/or software, and the combination is configured for wired and/or wireless communications on a network 50. In various examples, the user device 40 may be a computer device in any form such as a server, a desktop computer, a mobile phone, a smartphone, a personal digital assistant, a notebook computer, a smart television, a smart display screen or a tablet device or the like. The user device 40 may be communicatively coupled to the server 10 via the network 50.

The water dispenser 20 is for a replaceable water bottle 21 to be mounted thereon, and the weight sensor 30 is arranged in the water dispenser 20. The weight sensor 30 is used to measure a weight of the replaceable water bottle 21 on the water dispenser 20. The water dispenser 20 further comprises a holder 22 for receiving the replaceable water bottle 21 and a tap element 23 configured to be in water receiving communication with the replaceable water bottle 21 and to be user-actuatable between an open state and a closed state. The tap element 23 is configured to allow water to be dispensed therefrom when in the open state and to prevent water from being dispensed therefrom when in the closed state.

Hereinafter, unless otherwise specified, the term "weight" refers to a weight of the replaceable water bottle 21, which is a total weight of the water in the replaceable water bottle 21 and the replaceable water bottle 21. In other embodiments, the term "weight" may refer to a net weight of the water in the replaceable water bottle 21 only.

In an embodiment, the weight sensor 30 may be communicatively coupled to the server 10 through the network 50, or the weight sensor 30 may be communicatively coupled to the server 10 through the network 50 via the water dispenser 20. The network 50 may be implemented via a single network or a combination of a plurality of networks. For example, in various embodiments, the network 50 may include the Internet and/or one or more intranets, a cloud network, a landline network, a wireless network, and/or other proper types of communication networks. In another example, the network 50 may include a wireless telecommunication network (such as a telephone network) in communication with other wireless communication networks (such as the Internet).

Figure 3A:
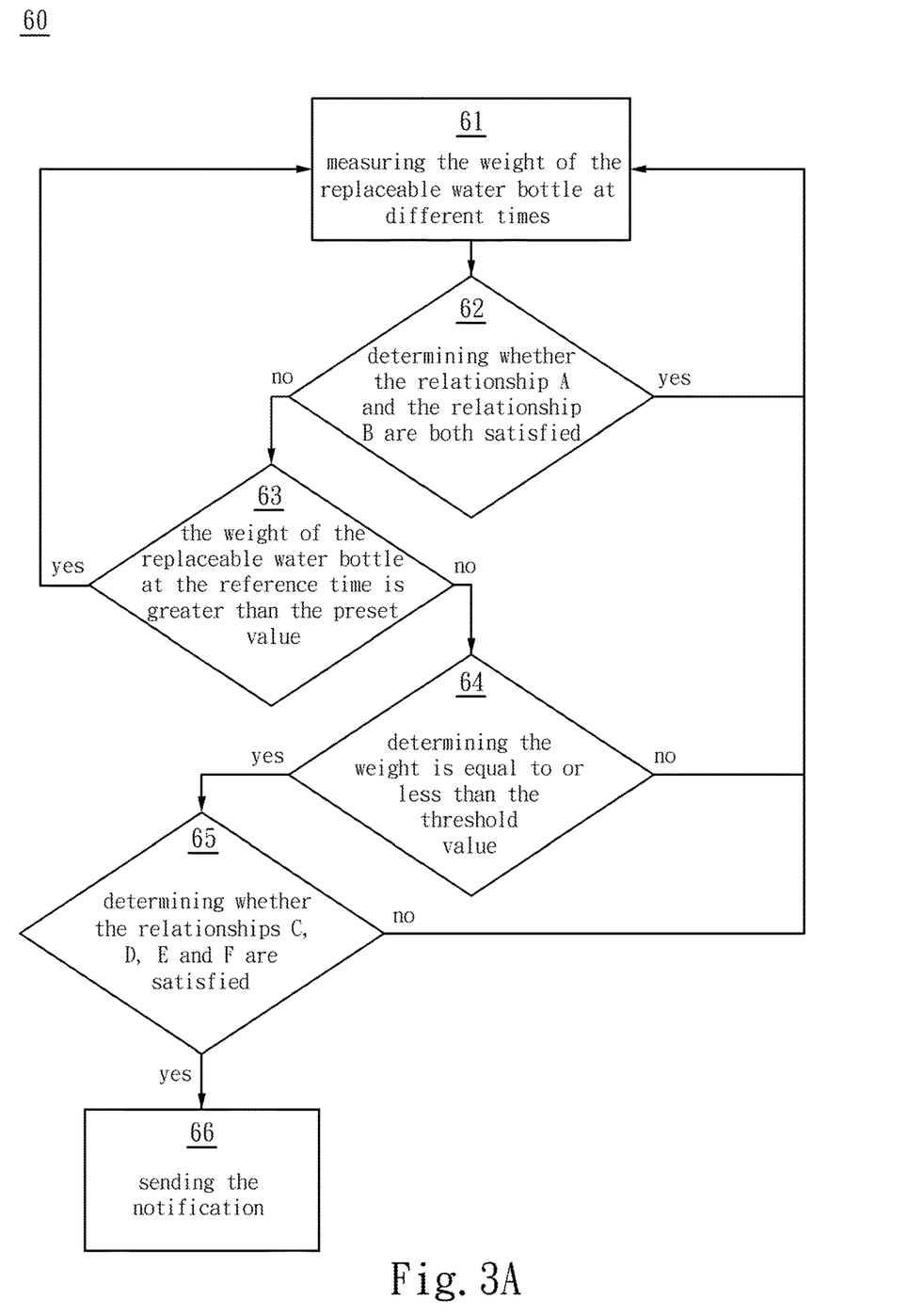
FIG. 3A shows a flow diagram according to an embodiment of the present invention.
Figure 3B:
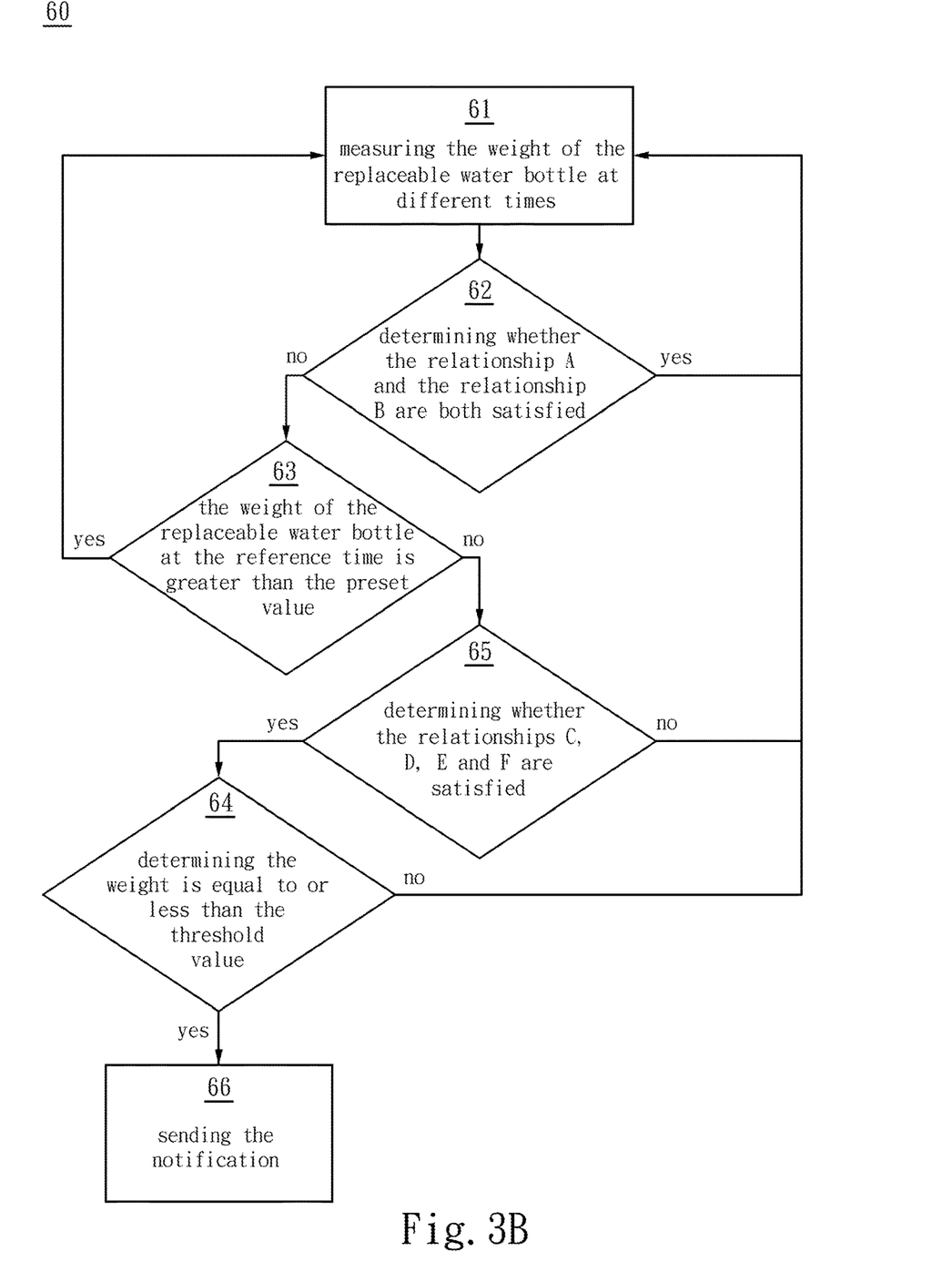
FIG. 3B shows a flow diagram according to another embodiment of the present invention.

Referring to FIG. 3A, a flow diagram according to an embodiment of the present invention is shown. Operations of method 60 are presented below for illustration. In some embodiments, one or more additional operations that are not described herein may be performed. Besides, the order of the operations of method 60 is shown in FIG. 3A and described below is not intended to be limiting. For example, the operations of method 60 may be performed as shown in FIG. 3B.

In an operation 61, the weight of the replaceable water bottle 21 is measured by the weight sensor 30. In some embodiments, the weight sensor 30 transmits the weight of the replaceable water bottle 21 to the server 10 through the network 50 periodically at a regular interval of time (time period). In some embodiments, the weight can also be transmitted to the server 10 through the network 50 when the weight sensor 30 detects that the weight of the replaceable water bottle 21 changes. In other words, the weight sensor 30 may transmit back the weight on the basis of time changes or weight changes. Therefore, the processor 11 will obtain weights at different times, represented as $W_t$, $W_{t-1}$, $W_{t-2}$ ... $W_{t-n}$, where $W_t$ is the weight of the replaceable water bottle 21 at a time t, $W_{t-1}$ is the weight of the replaceable water bottle 21 at a time t-1, $W_{t-2}$ is the weight of the replaceable water bottle 21 at an earlier time t-2 earlier in time than the earlier time t-1, and $W_{t-n}$ is the weight of the replaceable water bottle 21 at a time t-n.

In an embodiment, the interval of time ranges from 30 minutes to 1 hour, $W_t$ is the weight at a current time and may be regarded as the weight at a reference time, $W_{t-1}$ is the weight at a time prior to the current time, and $W_{t-1}$ and $W_t$ are separated by the interval of time.

In an operation 62, the server 10 determines whether the weights at different times satisfy the following relationships:

$$(W_t - W_{t-1}) > C1 \qquad (A)$$

$$|W_t - W_0| < C2 \qquad (B),$$

Where $W_0$ is an initial weight of the replaceable water bottle 21 before use, and may be a predefined value or a value obtained by measurement; C1 and C2 are respectively different predetermined values. For example, C1 is a value greater or equal to zero and C2 is a value close to zero. The relationship A is for determining whether the replaceable water bottle 21 of the current time has more water (heavier) than the replaceable water bottle 21 of the time t-1. The relationship B is for determining whether the weight of the replaceable water bottle 21 of the current time is equal or approximate to the initial weight of the replaceable water bottle 21 (that is, the weight of new water bottle). If the replaceable water bottle 21 of the current time is a new water bottle, the weight of the replaceable water bottle 21 of the current time will be larger than the weight of the replaceable water bottle 21 of the time t-1 and the weight of the replaceable water bottle 21 of the current time will be equal or approximate to the initial weight of the replaceable water bottle 21.

Figure 4:
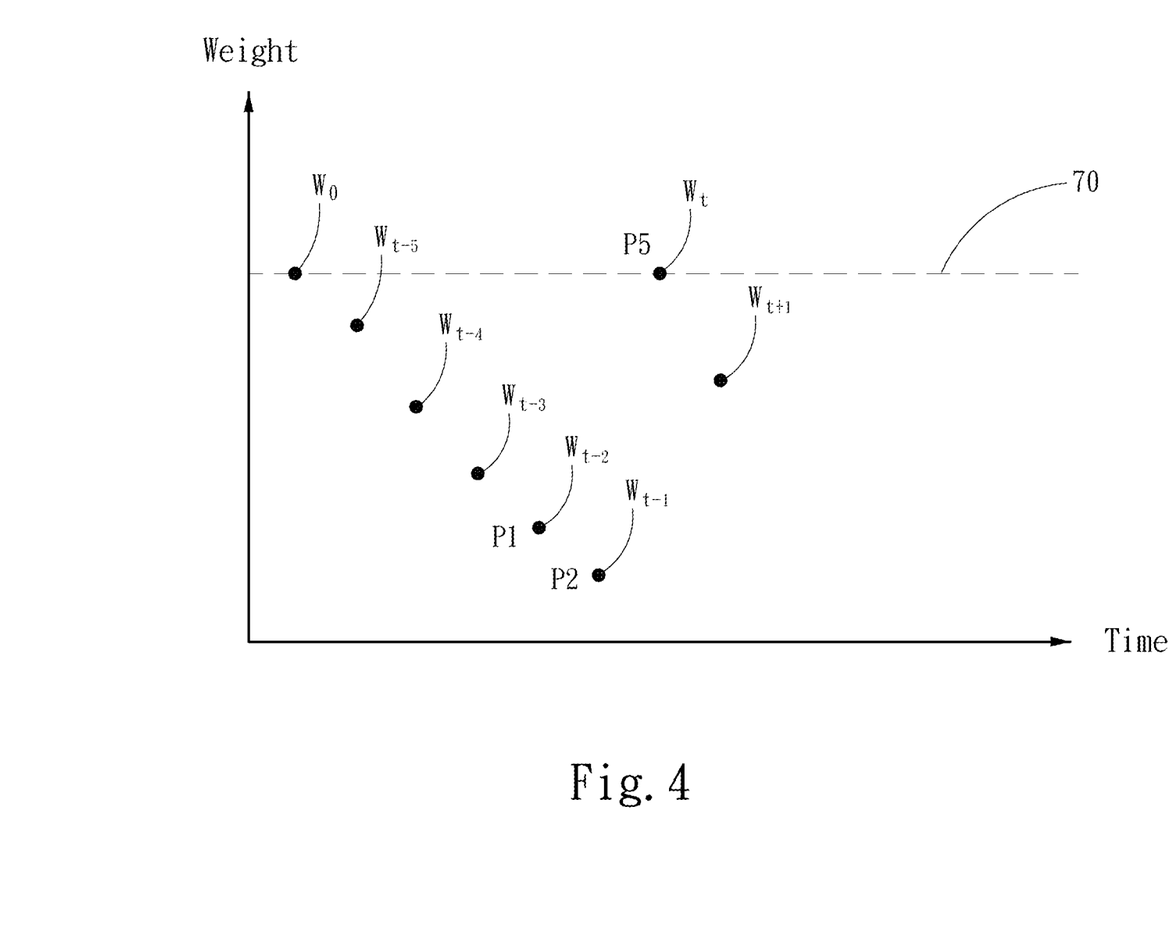
FIG. 4 shows a schematic diagram of weights of a water bottle at different times according to an embodiment of the present invention.

If a relationship A and a relationship B are both satisfied, the server 10 determines that the replaceable water bottle 21 is a new water bottle that is not used and is fully filled with water. That is, no order or replacing reminder is needed to be sent to the user since the water bottle of the current time is still far from empty so returning to operation 61 to resume the periodical measurement and operation. However, in some embodiments, the server 10 may send a notification to the user to notify that a new water bottle has been installed. FIG. 4 shows a situation in which the relationship A and the relationship B are both satisfied, and the initial weight of the replaceable water bottle 21 before use is denoted as a line 70.

Figure 5A:
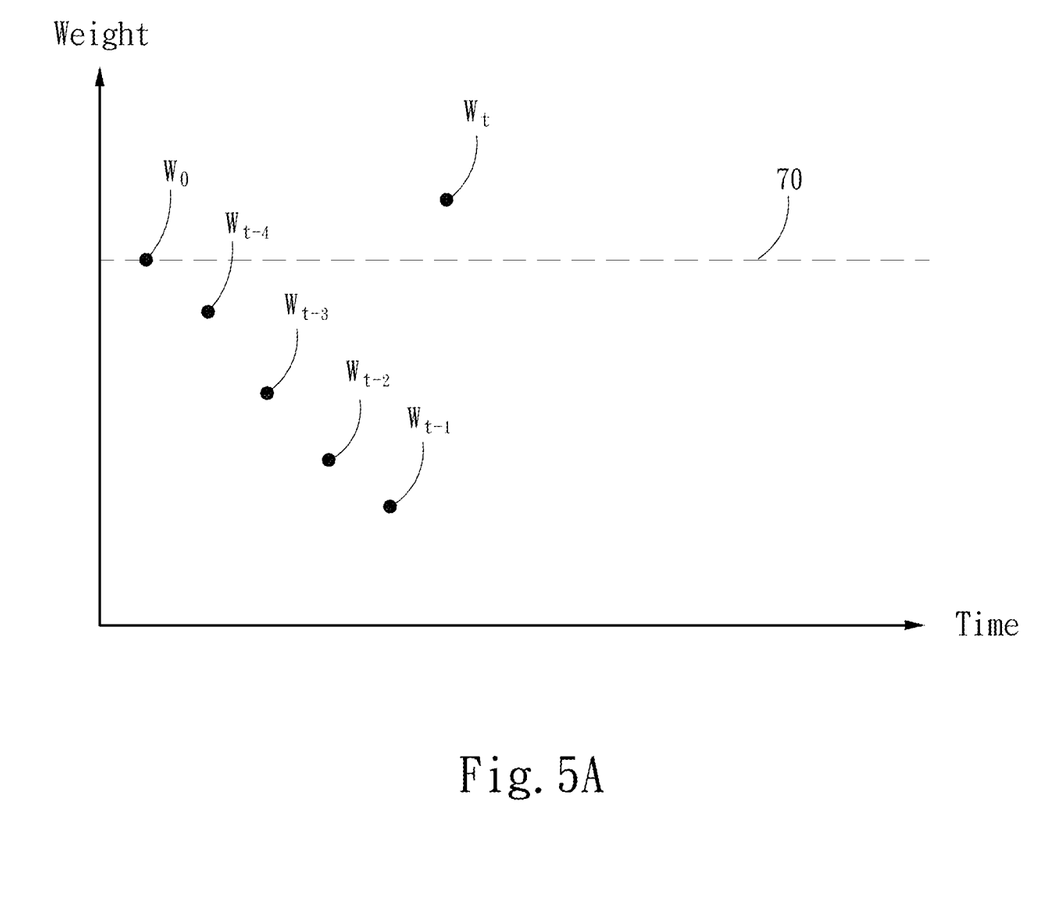
FIG. 5A to FIG. 5C each show a schematic diagram of weights of a water bottle at different times according to an embodiment of the present invention.

If the relationship A and the relationship B are not satisfied, it means the replaceable water bottle 21 of the time t is not the new one and has been using. Subsequently, an operation 63 is then performed. In an example, the operation 63 is performed when both of the relationships A and B are not satisfied, while in another example, the operation 63 is performed when any one of the relationships A and B is not satisfied. In the operation 63, the weight of the replaceable water bottle 21 at the reference time $W_t$ is compared with a preset value to check if the weight of the replaceable water bottle 21 at the reference time $W_t$ is an acceptable value (or true value). In an embodiment, the preset value is the initial weight of the replaceable water bottle 21 or a value approximate to the initial weight of the replaceable water bottle 21. FIG. 5A shows that the weight at the reference time $W_t$ is equal to or greater than the preset value (denoted as 70), representing that the weight of the replaceable water bottle 21 at the reference time $W_t$ is erroneous data (for example, erroneous determination of the weight due to toppling of the replaceable water bottle 21) and can be ignored, so that returning to the operation 61 to resume the periodical measurement and operation. If the weight at the reference time $W_t$ is less than the preset value, which means that the weight at the reference time $W_t$ is acceptable and the measurement of weight of replaceable water bottle 21 works normally. While in other embodiments, the operation 63 may be omitted.

Figure 5B:
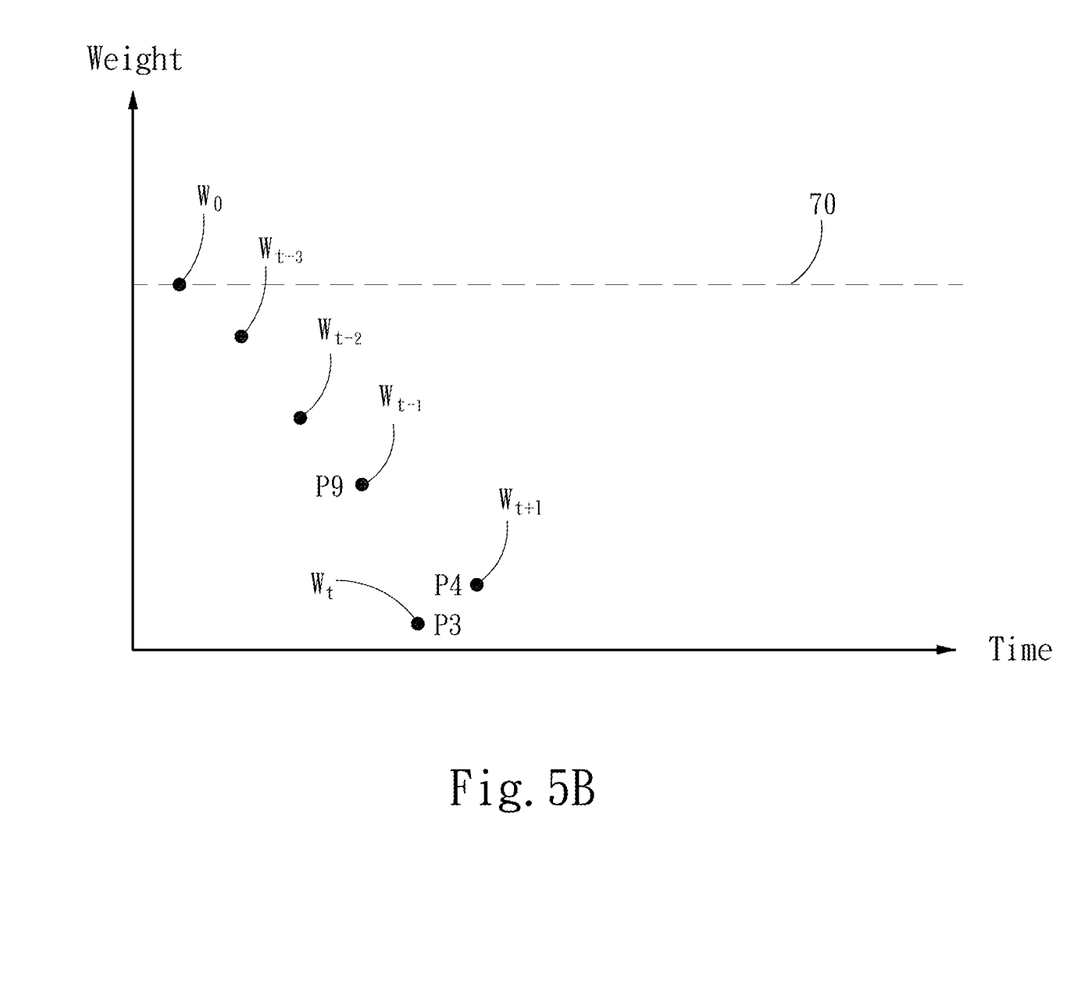
Figure 5C:
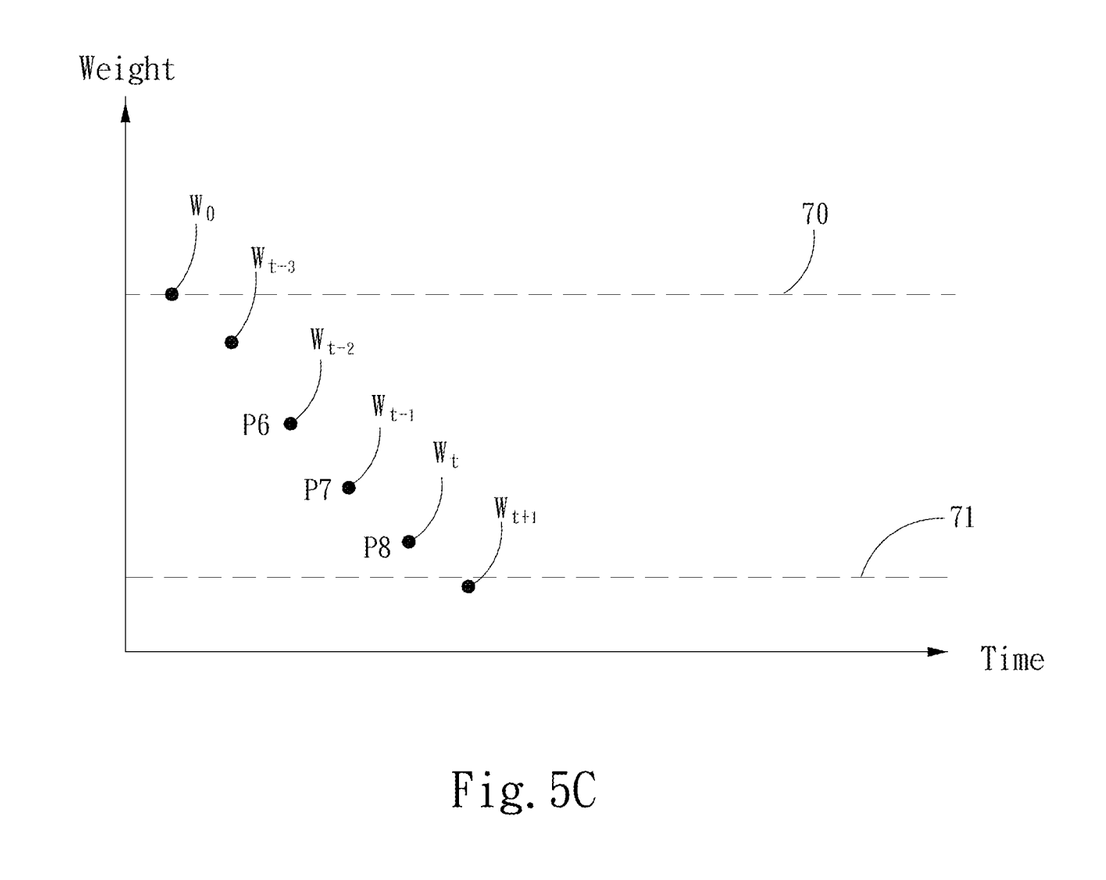

In an operation 64, if the weight at the reference time $W_t$ is determined to be acceptable or true in the operations 62 and/or 63, the weight $W_{t+1}$ at a time after the reference time $W_t$ is further compared with a threshold value (such as 71 in FIG. 5C). The threshold value may be set to be a positive value slightly larger than zero so as to check if the replaceable water bottle 21 is going to be empty or not. If the weight $W_{t+1}$ is equal to or less than the threshold value, which means the replaceable water bottle 21 only leaves some water and is going to be empty, then the subsequent operation is carried out.

In an operation 65, if all of the following relationships C and D are satisfied, it is determined that the weight at the reference time $W_t$ is valid; and if at least one of the following relations is not satisfied, it is determined that the weight at the reference time $W_t$ is invalid:

$$(W_{t-1}-W_t)<C3 \tag{C}$$

$$(W_{t+1}-W_t)<C4 \tag{D}$$

In the above relations, $W_{t+1}$ is the weight of the replaceable water bottle 21 at a time t+1, the time t+1 is a time after the current time, $W_{t+1}$ and $W_t$ are separated by the interval of time. In other embodiments, the relationships C, D may be modified to:

$$0<(W_{t-1}-W_t)<C3 \tag{C}$$

$$(W_{t+1}-W_t)<C4 \tag{D}$$

In other embodiments, the operation 65 may further determine whether the relationships C, D and the following relationships E, F are satisfied:

$$(W_0-W_{t+1})<C5 \tag{E}$$

$$(W_{t-1}-W_{t+1})<C6 \tag{F}$$

The C3, C4, C5 and C6 are respectively different predetermined values. The C1, C2, C3, C4, C5 and C6 in the above descriptions may denote a first predetermined value, a second predetermined value, a third predetermined value, a fourth predetermined value, a fifth predetermined value and a sixth predetermined value, respectively. The predetermined values may be a set of values which is pre-calculated (or pre-computed) and stored in the system. Alternatively, the predetermined values may be a set of values that is determined based on the measurement of the current or previous replaceable water bottle 21. The predetermined values may be a constant or a variable, respectively.

Besides, the predetermined values may be related or independent to each other. For example, C3 is a value that is equal or close to an average consumption between two measuring points (for example, $(W_{t-3}-W_{t-2})$ in FIG. 5A to FIG. 5C) or a value that is equal or close to $(W_{t+1}-W_{t-1})$ in FIG. 5B, C4 is a value less or equal to zero, C5 is a value greater than zero, and C6 is a value greater or equal to zero.

FIG. 5B shows the situation in which at least one of the relationships C and D is not satisfied, representing that the weight at the reference time $W_t$ is abnormal (the weight can be regarded as not progressively decreasing over time), and is invalid data and can be ignored, so that returning to the operation 61. FIG. 5C shows the situation in which relationships C and D (also E and F) are all satisfied, representing that the weight at the reference time $W_t$ is normal (the weight can be regarded as progressively decreasing over time), and thus is valid data.

If the weight at the reference time $W_t$ is valid, a notification prior to empty will be sent to the user (as an operation 66). In the operation 66, the server 10 transmits the notification to the user device 40 through the network 50, so that an application of the user displays the notification on a user interface of the application. In some examples, the notification may contain a message to notify the user that water in the replaceable water bottle 21 at the time is used up or is about to be used up (going to be empty soon). In this way, the water bottle supplier and/or the user may acquire a water quantity of the replaceable water bottle currently used by the user and remind the user that a new replaceable water bottle is needed for replacement.

In addition to the embodiment described above, the system may be modified to only determine some of the relationships C, D, E and F (for example, the relationships C, D, the relationships C, D, E or the relationships C, D, F) in the operation 65.

Table 1 and table 2 show some non-limiting examples to explain error data determination in the operation 62 and the operation 65. Data 1 can be viewed as corresponding to points P1 and P2 in FIG. 4. Data 2 can be viewed as corresponding to points P3 and P4 in FIG. 5B. Data 3 can be viewed as corresponding to points P2 and P5 in FIG. 4. Data 4 can be viewed as corresponding to points P6, P7 and P8 in FIG. 5C. Data 5 and Data 6 can be viewed as corresponding to points P9, P3 and P4 in FIG. 5B.

TABLE 1

|  | Data 1 | Data 2 | Data 3 |
|---|---|---|---|
| $W_0$ | 5 kg | 5 kg | 5 kg |
| $W_{t-1}$ | 1 kg | 1 kg | 1 kg |
| $W_t$ | 0.8 kg | 1.3 kg | 5 kg |
| C1 | 0 | 0 | 0 |
| C2 | 0.1 | 0.1 | 0.1 |
| Relationship A | not satisfied | satisfied | satisfied |
| Relationship B | not satisfied | not satisfied | satisfied |
| Status | not new water bottle | not new water bottle and also error data occurred | new water bottle |
| Action | proceeding to operation 63 | proceeding to operation 63 | returning to operation 61 |

TABLE 2

|  | Data 4 | Data 5 | Data 6 |
|---|---|---|---|
| $W_0$ | 5 kg | 5 kg | 5 kg |
| $W_{t-1}$ | 1 kg | 1 kg | 1 kg |
| $W_t$ | 0.9 kg | 0.9 kg | 0.6 kg |
| $W_{t+1}$ | 0.8 kg | 0.95 kg | 0.8 kg |
| C3 | 0.15 | 0.15 | 0.15 |
| C4 | −0.05 | −0.05 | −0.05 |
| Relationship C | satisfied | satisfied | not satisfied |
| Relationship D | satisfied | not satisfied | not satisfied |
| Status | water is progressively decreasing as expected | error data | error data |
| Action | proceed to operation 66 | returning to operation 61 | returning to operation 61 |

Although the weight of the replaceable water bottle 21 is used as the basis for performing determination in the above-mentioned operations, the present invention is not limited thereto. In other embodiments, a determination may also be performed by utilizing the weight of the replaceable water bottle 21 detected by the weight sensor 30 and converting the weight into a volume. In such an example, the relationships A', B', C', D', E' and F' are represented as follows:

$$(V_t - V_{t-1}) > C1' \quad (A')$$

$$|V_t - V_0| < C2' \quad (B')$$

$$(V_{t-1} - V_t) < C3' \quad (C')$$

$$(V_{t+1} - V_t) < C4' \quad (D')$$

$$(V_0 - V_{t+1}) < C5' \quad (E')$$

$$(V_{t-1} - V_{t+1}) < C6' \quad (F')$$

$V_t$ denotes the estimated volume at the reference time t, $V_{t-1}$ denotes the estimated volume at an earlier time t−1 earlier in time than the reference time t, $V_0$ denotes a predetermined initial volume of water in the water bottle 21, $V_{t+1}$ denotes the estimated volume at a later time t+1 later in time than the reference time t. The C1', C2', C3', C4', C5' and C6' in the above description may denote a first predetermined value, a second predetermined value, a third predetermined value, a fourth predetermined value, a fifth predetermined value and a sixth predetermined value, respectively. The C1', C2', C3', C4', C5' and C6' are another sets of values which differs from the C1, C2, C3, C4, C5 and C6. However, it should be understood that the C1', C2', C3', C4', C5' and C6' are corresponding to the C1, C2, C3, C4, C5 and C6, respectively.

One of the advantages of the present invention is that, by multiple comparisons of weight data in the operations, the consumption of water by the user can be managed and tracked accurately without being affected by error data.

Figure 6:
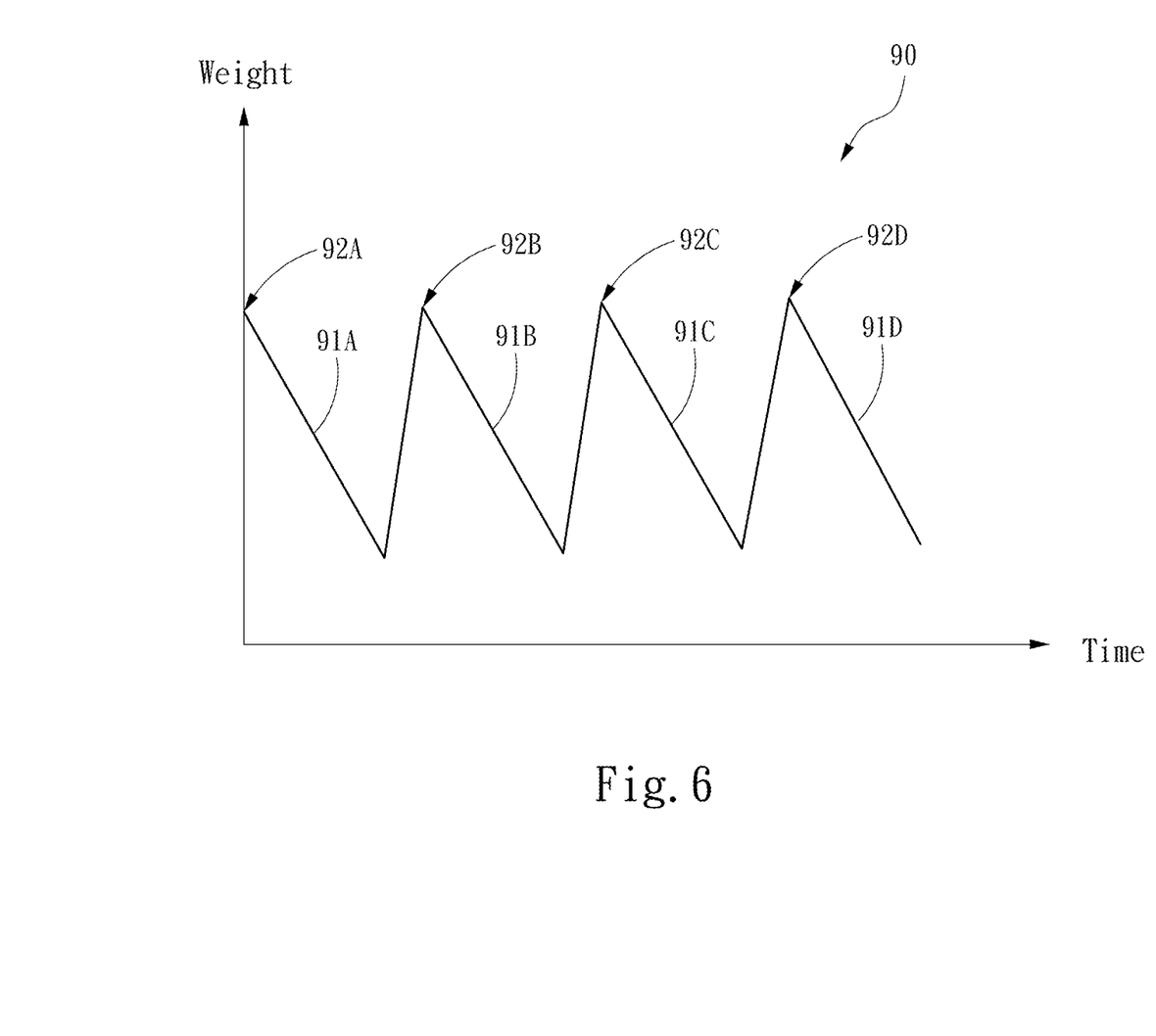
FIG. 6 shows a schematic diagram of weights of a water bottle at different times according to an embodiment of the present invention.

Besides, unlike using a flow meter to measure usage of drink or water described in some prior arts, the weight sensor has the advantages as follows. Similar to the weighing scale, the weight sensor can measure the instant weight of the water bottle in units of mass rather than in units of mass per unit time (or volume per unit time) measured by the flow meter. The recorded plot of the measured weights obtained by the weight sensor 30 is characterized in a sort of wave-like trend (represented as 90 in FIG. 6) as shown in FIG. 6 since every new water bottle has a nearly identical initial weight (prior to use) and every empty water bottle has a nearly identical residual weight (after use). The peak (represented as 92A, 92B, 92C, and 92D in FIG. 6) and the lowest point in the plot can be easily determined by the steps of the present invention so as to find the timing of replacing the water bottle and the number of water bottles that have been used up. That is being said, a single downward sloping line (represented as 91A, 91B, 91C, and 91D in FIG. 6) is corresponding to a consumption cycle of the single water bottle. In contrast to the weight sensor, it is difficult to obtain similar results by using the flow meter. The flow meter (volumetric flow meter or mass flow meter) is configured to measure the mass flow rates of fluids passing a fixed point in a predetermined unit of time. It may be possible to calculate the mass (or volumetric) consumption of the water bottle over a given period of time by using the flow meter. However, the initial mass (or volume) of the water bottle prior to use cannot be read out on the recorded plot of the flow rate. As a result, it is difficult to find out when the water bottle is replaced and also the number of used water bottles.

In one aspect of the present invention, the system may use the determination obtained in the operation 62 to determine, via the operation 62, the quantity of the replaceable water bottles 21 used by the same user after a single order. For example, if the user has ordered N replaceable water bottles 21, when the determination in the operation 62 is satisfied (that is, both the relationship A and the relationship B are satisfied) M times, it may be known that the user has used M replaceable water bottles 21, and there are (N-M) unused replaceable water bottles 21 left. Therefore, when the value of (N-M) is less than a threshold quantity, the system may send a notification to the user. The server 10 transmits the notification to the user device 40 through the network 50, so that the application of the user displays the notification on the user interface of the application. In some examples, the notification may contain a message indicating to the user that all of the replaceable water bottles 21 are about to be used up. In this way, the bottle water supplier may acquire a quantity of the used (or unused) replaceable water bottles of the user, and reminds the user to order new replaceable water bottles. Still further, according to various embodiments, the user may set a targeted quantity of the water bottle or a targeted volume of water to drink. The system of the present invention may let the user know how many a number of water bottles have been used or drunk by the user, or how much water has been used or drunk by the user, so that the user can manage to drink or to order water through the system.

Figure 7:
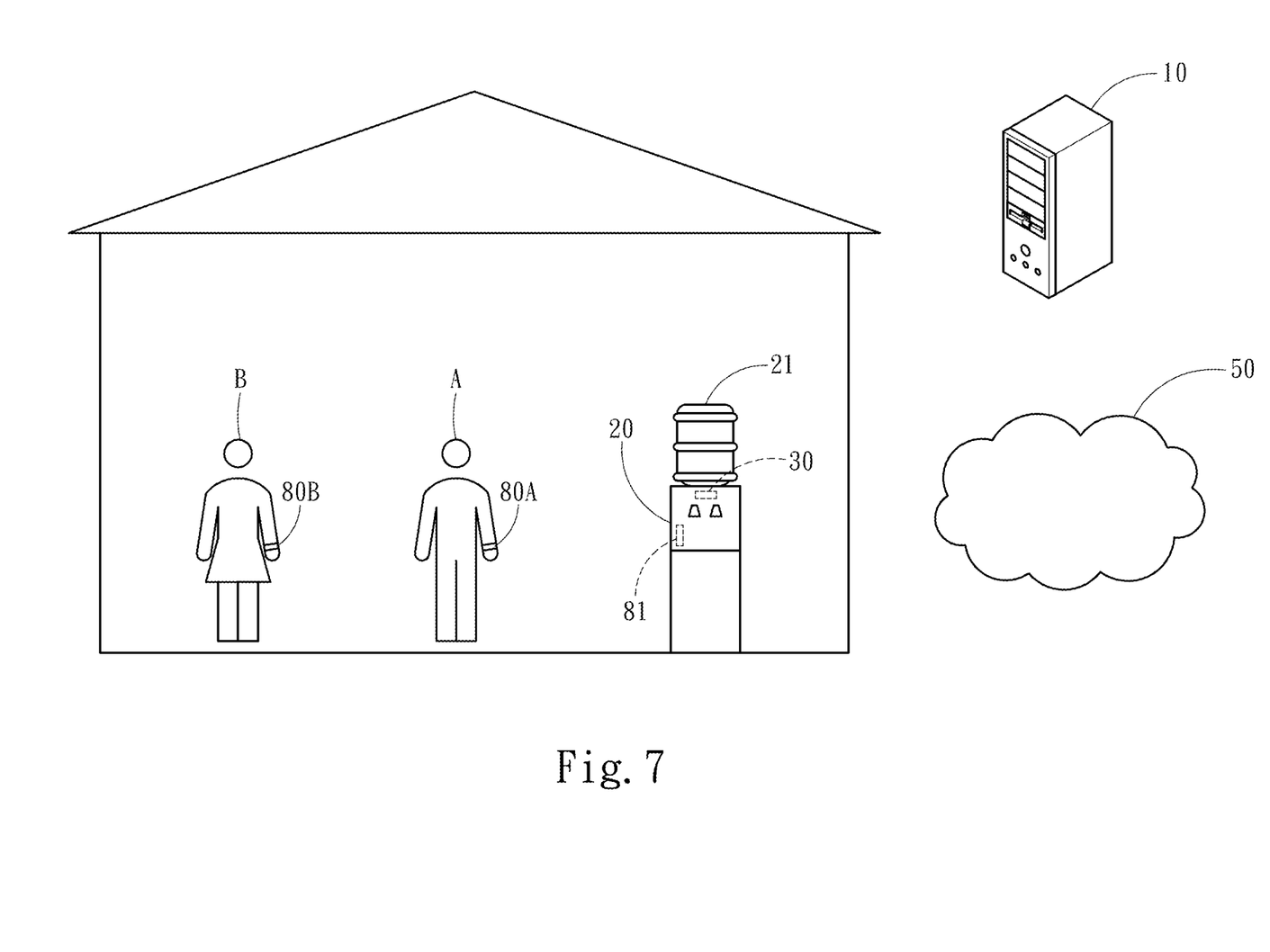
FIG. 7 shows a contextual diagram according to an embodiment of the present invention.

FIG. 7 shows a contextual diagram according to an embodiment of the present invention. In FIG. 7, the system in the previous embodiment may further include at least one of user sensors 80A and 80B and a device sensor 81. The at least one of user sensors 80A and 80B are separately worn by a user A and a user B. The device sensor 81 is mounted on the water dispenser 20. In some embodiments, the sensors may be independent devices, or the at least one of user sensors 80A and 80B may further be integrated with the user device 40, or the device sensor 81 may further be integrated with the weight sensor 30 or the water dispenser 20. It can be understood that although two users respectively wearing the user sensors are used as an example here, the present invention is not limited thereto, and may further be applied to a single user and a single user sensor or more users and more user sensors.

Figure 8:
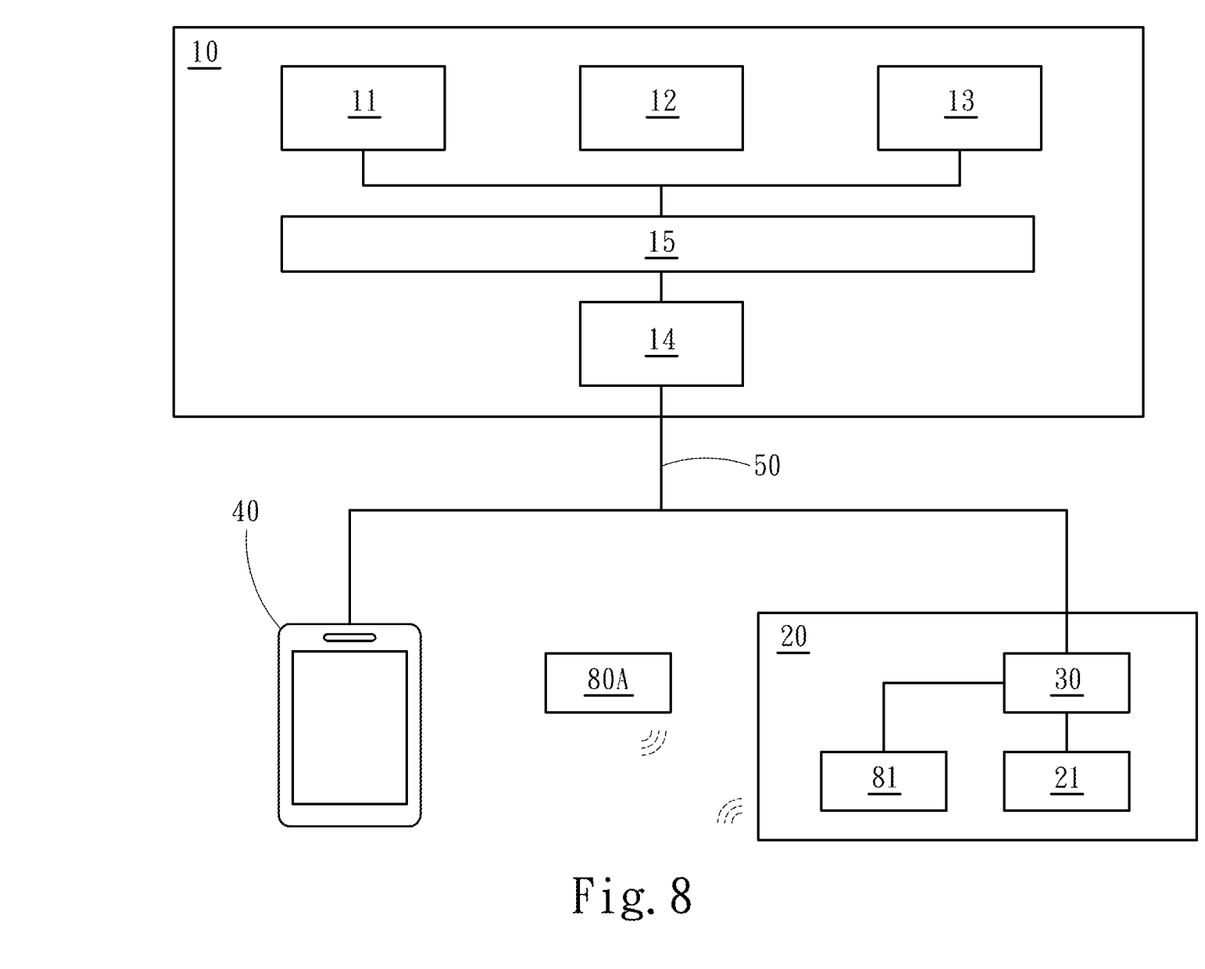
FIG. 8 shows a block diagram according to an embodiment of the present invention.

The at least one of user sensors 80A and 80B and the device sensor 81 may be a pair of sensors respectively matched with each other, for example, an RFID identifier and an RFID reader, respectively. When the user A is about to take water from the water dispenser 20 to drink, the device sensor 81 senses the user sensor 80A (referring to FIG. 8). When the user sensor 80A is sensed and the weight of the replaceable water bottle 21 changes, the weight change of the replaceable water bottle 21 is related to the user of the user sensor 80A. Similarly, when the user sensor 80B is sensed and the weight of the replaceable water bottle 21 changes, a weight change of the replaceable water bottle 21 is related to the user of the user sensor 80B. A water intake of the user A or the user B can be acquired by the weight change of the replaceable water bottle 21.

Figure 9:
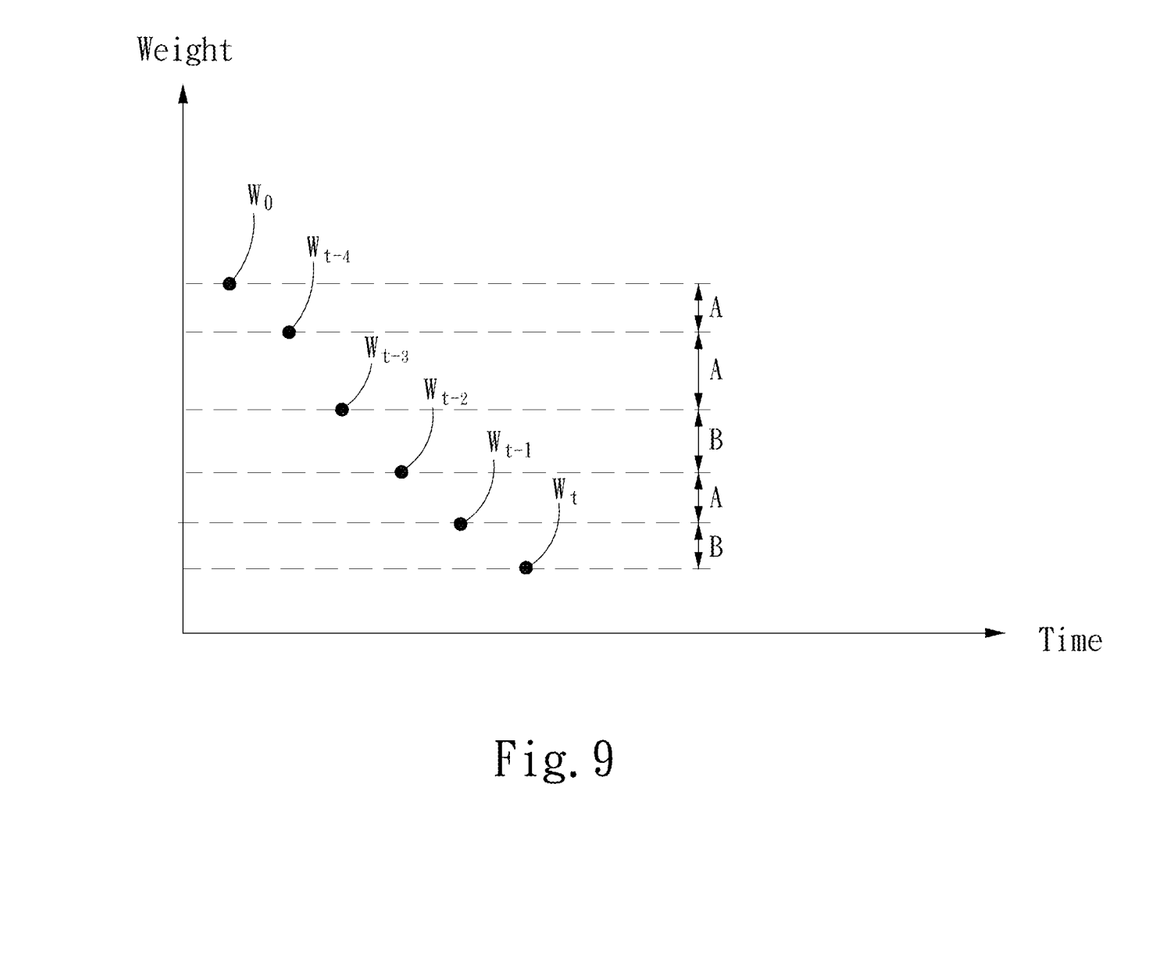
FIG. 9 is a schematic diagram showing a result of tracking the water intake of a user according to an embodiment of the present invention.

FIG. 9 is a schematic diagram showing a result of tracking the water intake of a user according to an embodiment of the present invention. The above-mentioned system can be used to acquire that in FIG. 9, the weight change from $W_0$ to $W_{t-4}$, the weight change from $W_{t-4}$ to $W_{t-3}$ and the weight change from $W_{t-2}$ to $W_{t-1}$ are related to the user A, and the weight change from $W_{t-3}$ to $W_{t-2}$ and the weight change from $W_{t-1}$ to $W_t$ are related to the user B.

Except for tracking the water intake of the user, the at least one of user sensors 80A and 80B and the device sensor 81 can also be configured to provide customized functions. For example, the user A may preset a user file corresponding to the user sensor 80A at the water dispenser 20. The user file may include a preset water temperature and a preset water yield. When the user A is about to take water from the water dispenser 20 to drink, the device sensor 81 will sense the user sensor 80A. In this way, when the water dispenser 20 dispenses water, the water dispenser 20 will use the preset water temperature and the preset water yield corresponding to the user A according to the user file.

What is claimed is:

1. A system for advance notification of replacing a water bottle based on historical consumption data, the system comprising:
   one or more hardware processors configured by machine-readable instructions to:
   receive a plurality of measured weights of the water bottle over a time period, which is measured and mounted on a water dispenser;
   determine whether the measured weights of the water bottle before and at a reference time satisfy the following relationships:

$(W_t - W_{t-1}) > C1$; and  A.

$|W_t - W_0| < C2$;  B.

wherein said $W_t$ denotes the measured weight of the water bottle at the reference time t, $W_{t-1}$ denotes the measured weight of the water bottle at an earlier time t−1 earlier in time than the reference time t, said $W_0$ denotes a predetermined initial weight of the water bottle, said C1 denotes a first predetermined value and said C2 denotes a second predetermined value;

if the relationship A and the relationship B are satisfied, the water bottle at the reference time being regarded as a new water bottle;
   if the relationship A and the relationship B are not satisfied:
   compare the measured weight with a threshold value;
   if the measured weight is below the threshold value, determine whether the measured weight at the reference time is valid when the measured weights of the water bottle before, after, and at the reference time satisfy the following relationships:

$(W_{t-1} - W_t) < C3$; and  C.

$(W_{t+1} - W_t) < C4$;  D.

wherein said $W_{t+1}$ denotes the measured weight of the water bottle at a later time t+1 later in time than the reference time t, said C3 denotes a third predetermined value, and said C4 denotes a forth predetermined value; and
   send a notification to a customer of the water dispenser when the determination is made that the measured weight at the reference time is valid.

2. The system of claim 1, wherein the threshold value is to indicate that the water bottle is going to be empty.

3. The system of claim 1, wherein said C1, C2, C3, and C4 are different from each other, and wherein said C1 is a value greater or equal to zero, said C2 is a value close to zero, said C3 is equal or close to an average consumption between two measuring points, and said C4 is a value less or equal to zero.

4. The system of claim 1, wherein the threshold value is compared with the measured weight of the water bottle at the later time t+1 or the measured weight of the water bottle at the reference time t.

5. A system for advance notification of replacing a water bottle based on historical consumption data, the system comprising:
   one or more hardware processors configured by machine-readable instructions to:
   receive a plurality of measured weights of the water bottle over a time period, which is measured and mounted on a water dispenser;
   convert the measured weights into a plurality of corresponding estimated volumes of water in the water bottle;
   determine whether the estimated volumes before and at a reference time satisfy the following relationships:

$(V_t - V_{t-1}) > C1'$; and  A.

$|V_t - V_0| < C2'$;  B.

wherein said $V_t$ denotes the estimated volume at the reference time t, said $V_{t-1}$ denotes the estimated volume at an earlier time t−1 earlier in time than the reference time t, said $V_0$ denotes a predetermined initial volume of water in the water bottle, said C1' denotes a first predetermined value and said C2' denotes a second predetermined value;
   if the relationship A and the relationship B are satisfied, the water bottle at the reference time being regarded as a new water bottle;
   if the relationship A and the relationship B are not satisfied:
   compare the estimated volume with a threshold value;
   if the estimated volume is below the threshold value, determine whether the estimated volume at the reference time is valid when the estimated volumes before, after, and at the reference time satisfy the following relationships:

$$(V_{t-1} - V_t) < C3'; \text{ and} \quad\quad\quad C.$$

$$(V_{t+1} - V_t) < C4'; \quad\quad\quad D.$$

wherein said $V_{t+1}$ denotes the estimated volume at a later time t+1 later in time than the reference time t, said C3' denotes a third predetermined value, and said C4' denotes a fourth predetermined value; and send a notification to a customer of the water dispenser when the determination is made that the estimated volume at the reference time is valid.

6. The system of claim 5, wherein the threshold value is to indicate that the water bottle is going to be empty.

7. The system of claim 5, wherein said C1', C2', C3', and C4' are different from each other, and wherein said C1' is a value greater or equal to zero, said C2' is a value close to zero, said C3' is equal or close to an average consumption between two measuring points, and said C4' is a value less or equal to zero.

8. The system of claim 5, wherein, wherein the threshold value is compared with the estimated volume at the later time t+1 or the estimated volume at the reference time t.

9. A water dispenser comprising:
a replaceable water bottle;
a holder for receiving the replaceable water bottle;
a tap element configured to be in water receiving communication with the replaceable water bottle and to be user-actuatable between an open state and a closed state, the tap element being configured to allow water to be dispensed therefrom when in the open state and to prevent water from being dispensed therefrom when in the closed state;
a weight sensor to measure a measured weight of the replaceable water bottle; and
one or more hardware processors configured by machine-readable instructions to:
receive a plurality of measured weights of the replaceable water bottle over a time period;
determine whether the measured weights of the replaceable water bottle before and at a reference time satisfy the following relationships:

$$(W_t - W_{t-1}) > C1; \text{ and} \quad\quad\quad A.$$

$$|W_t - W_0| < C2; \quad\quad\quad B.$$

wherein said $W_t$ denotes the measured weight of the replaceable water bottle at the reference time t, said $W_{t-1}$ denotes the measured weight of the replaceable water bottle at an earlier time t−1 earlier in time than the reference time t, said $W_0$ denotes a predetermined initial weight of the replaceable water bottle, said C1 denotes a first predetermined value and said C2 denotes a second predetermined value;

if the relationship A and the relationship B are satisfied, the replaceable water bottle at the reference time being regarded as a new water bottle;

if the relationship A and the relationship B are not satisfied:
compare the measured weight with a threshold value;
if the measured weight is below the threshold value, determine whether the measured weight at the reference time is valid when the measured weights of the replaceable water bottle before, after and at the reference time satisfy the following relationships:

$$(W_{t-1} - W_t) < C3; \text{ and} \quad\quad\quad C.$$

$$(W_{t+1} - W_t) < C4; \quad\quad\quad D.$$

wherein said $W_{t+1}$ denotes the measured weight of the replaceable water bottle at a later time t+1 later in time than the reference time t, said C3 denotes a third predetermined value, and said C4 denotes a fourth predetermined value; and send a notification to a customer of the water dispenser when the determination is made that the measured weight at the reference time is valid.

10. The water dispenser of claim 9, wherein the threshold value is to indicate that the water bottle is going to be empty.

11. The water dispenser of claim 9, wherein said C1, C2, C3, and C4 are different from each other, and wherein said C1 is a value greater or equal to zero, said C2 is a value close to zero, said C3 is equal or close to an average consumption between two measuring points, and said C4 is a value less or equal to zero.

12. The water dispenser of claim 9, wherein the threshold value is compared with the measured weight of the water bottle at the later time t+1 or the measured weight of the water bottle at the reference time t.

* * * * *